Feb. 21, 1956  E. THOMPSON, JR  2,735,276
PROCESS AND APPARATUS FOR CONTINUOUSLY
FREEZING CONFECTIONS
Filed April 17, 1952
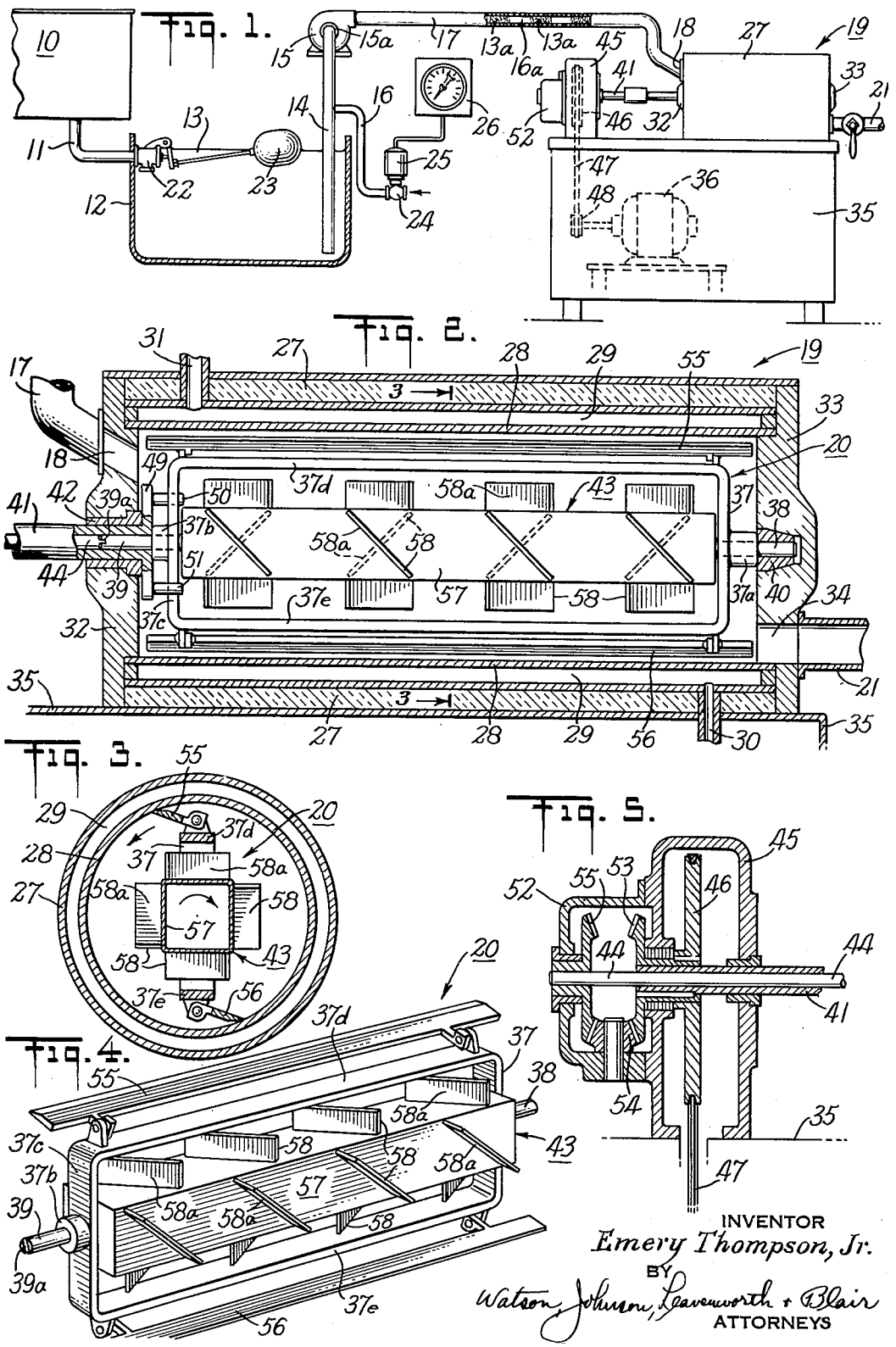
INVENTOR
*Emery Thompson, Jr.*
BY
*Watson, Johnson, Leavenworth & Blair*
ATTORNEYS United States Patent Office 2,735,276
Patented Feb. 21, 1956

1

2,735,276

PROCESS AND APPARATUS FOR CONTINUOUSLY FREEZING CONFECTIONS

Emery Thompson, Jr., New Rochelle, N. Y., assignor to Emery Thompson Machine & Supply Company, New York, N. Y., a corporation of New York Application April 17, 1952, Serial No. 282,881

19 Claims. (Cl. 62—114)

This invention relates to an improved method and apparatus of manufacturing frozen confections such as ice cream, ices, frozen custards and the like from prepared mixes, and which are characterized by a predetermined over-run, i. e. which include as a constituent a predetermined amount of air or other gas as may be required or desired.

Frozen confections are commercially manufactured in most instances by batch or continuous processes. The former has become highly developed and produces a high quality product, the characteristics of which can be controlled within narrow limits. Its major shortcoming, however, is its intermittent character with consequent loss of time between successive freezes. Accordingly, where it is desired to produce large qualities of such products, the batch process is neither efficient nor economical. Hereinafter such products will be referred to generically as ice cream.

To overcome the shortcomings of the batch process and apparatus, many attempts have been made to devise methods and apparatus for continuously freezing ice cream. Many of these attempts have met with but indifferent success and even less commercial acceptance by reason of the complexity and cost of the apparatus and the difficulties involved in using it. Certain of these devices comprise multiple stage units wherein the mix is first partially frozen and thereafter whipped in the presence of air or other gas to attain the desired overrun. Such apparatus is objectionable for two reasons; at least two machine units are required (which complicates the timing of the over-all operation), and very considerable difficulty is encountered in properly and accurately regulating the air or gaseous content to achieve the desired overrun.

Other continuously operating ice cream freezers attempt to attain the desired percentage of overrun by injecting a stream of air into a single unit freezer during the freezing and concurrent whipping operations. Using such apparatus it is not only almost impossible to attain, with any degree of accuracy, the desired overrun, but also the formation of air pockets in the freezer contents is not an infrequent occurrence.

Various other expedients have been resorted to in the attempt to regulate the inflow of air but each has its objectionable features.

It is accordingly among the objects of this invention to provide a method and apparatus for producing ice cream which overcomes the aforementioned shortcomings as well as others in a thoroughly practical and efficient manner. Other objects will be in part apparent and in part pointed out hereinafter.

In the drawing, wherein I have shown a preferred embodiment of one type of apparatus capable of carrying out my method or process, Figure 1 is a fragmentary partially sectional diagrammatic view of the apparatus;

Figure 2 is an enlarged fragmentary sectional elevation of the freezing chamber;

2

Figure 3 is a reduced vertical section taken along the line 3—3 of Figure 2;

Figure 4 is an enlarged perspective view of the dasher mechanism; and,

Figure 5 is a fragmentary sectional elevation of a reversing mechanism adapted for optional use in driving the dasher.

In accordance with the practice of my method or process which will be discussed in greater detail hereinbelow, a mix supply tank, preferably of substantial capacity, is piped to what might be termed a delivery tank, of lesser capacity, wherein the mix is maintained at a constant level under atmospheric pressure. The mix is fed from the delivery tank in intermittent slugs of fixed quantity interspersed with slugs of air or other gas of predetermined and selectively variable amount. These alternate slugs of mix and air are conducted to and fed under pressure into the inlet end of the freezer preferably at a point adjacent the refrigerated inner surface thereof where they are immediately subjected to the action of a dasher, scraper blades and whipping device. The slugs of mix and air, of course, soon lose their integral form under such action, as the air is rapidly beaten into the mix. As the combined mix and air progress through the freezing chamber, its temperature is progressively lowered, and it is whipped so that ice cream of the desired texture and hardness is ultimately discharged from the outlet end of the freezer in a continuous stream. During the passage of the mixture of air and mix through the freezer it is caused to flow along the refrigerated inner surface of the freezing chamber, thence inwardly therefrom toward the axis of the chamber. As the mixture flows along the refrigerated surface, its temperature is, of course, lowered and sooner or later frozen flakes are generated. These flakes together with uncongealed mixture are directed toward the axis of the freezer where they are whipped to a more homogeneous composition. At the same time the flow is so diverted that there is a tendency for it to travel toward the inlet end of the freezer. This action facilitates the whipping action and contributes largely to the creation of the texture desired. The following amounts of mixture, of course, force the preceding mixture outwardly of the freezing axis so that the whipped mixture is again and indeed repeatedly subjected to the freezing action of the freezer wall and the whipping action in the vicinity of the freezer axis. Or, expressed differently, it might be said that any given particle of the mixture follows a complex curved path starting, for example, at a point on the freezer wall and extending therefrom forwardly and inwardly toward the freezer axis, thence rearwardly and inwardly, and thence outwardly and forwardly to another point, the end of the path on the freezer wall forwardly of the starting point. The forward displacement of the end of the path relative to its starting point results from the pressure of the inflow of mix and air, this pressure, of course, serving to effect the discharge of ice cream at the outlet of the freezer. The rearward component of movement as described beneficially affects both the efficient attainment of the desired overrun and the ultimate texture of the ice cream.

While my foregoing method or process might be practiced by various forms of freezers, the one herein disclosed includes components that are preferably included by reason of their ready availability or inexpensive manufacture, efficient and dependable operation and for the further reason that with their use certain types of commercial batch freezers may readily be modified for continuous operation.

As shown in Figure 1, the apparatus includes a supply or storage tank 10 which is preferably of substantial capacity, so as to preclude the necessity of frequent refilling. This tank communicates by way of a pipe 11 with a float-controlled delivery tank 12, from which the mix 13 is withdrawn in intermittent slugs through a pipe 14 by a pump 15. Pump 15 also draws air into pipe 14, also in intermittent slugs, by way of a valve-controlled air line 16, the alternate slugs 13a and 16a of mix and air flowing through a pipe 17 to the inlet passage 18 (Figure 2) of the freezer, which is generally indicated at 19. A dasher, generally indicated at 20, is rotatably disposed within freezer 19, which acts on the mixture of mix and air in a manner to be hereinafter described, so that ultimately ice cream of the desired texture and overrun is discharged into containers or hardening cans, as desired, by way of outlet 21.

Referring back to Figure 1, it will be seen that the outlet end of pipe 11 includes a valve 22, which is controlled by a float 23 in well-known manner, to maintain the level of mix 13 in tank 12 at a constant value. The importance of this feature lies in the fact that it is important to maintain the distance between the liquid level and the inlet 15a of pump 15 at a constant value so that successive slugs 13a of the mix do not vary quantitatively.

At the intake end of air line 16 is a valve 24 controlled preferably by a solenoid 25, the intermittent energization of which is effected by an adjustable timing mechanism 26 so that the open time of valve 24 may be varied in accordance with the overrun desired. It will accordingly appear that as pump 15 (this is a constant delivery pump) operates, it will suck mix from tank 12 as long as valve 24 is closed. When valve 24 opens, however, in response to energization of solenoid 25, as dictated by timer 26, the pump draws air through line 16, and the flow of mix ceases. The effect of this is the creation of a flow of alternate slugs of mix 13a and air 16a through pipe 17 to freezer 19. Thus it will be seen that the amount of air which is ultimately whipped into the mix in the freezer may be accurately controlled within extremely narrow limits, thus making it easy to attain any prescribed overrun, and at the same time obviating the necessity of close attention to and frequent adjustment of the apparatus by a skilled operator. By the same token, the texture and density of the ice cream may quickly and easily be changed as desired merely by resetting timer 26 so that more or less air is pumped, as the specifications dictate. Furthermore by using atmospheric air, the need for a compressor is obviated and the risk of possible contamination from the use thereof is eliminated.

Freezer 19 (Figure 2) comprises among other things a refrigerated chamber of more or less conventional type, having an outer insulated shell 27, and an inner shell 28, the two shells defining an annular refrigerant chamber 29, into which refrigerant may flow by way of an inlet 30, and from which the refrigerant may flow by way of an outlet 31. The opposite ends of the freezer chamber are closed by end plates 32 and 33, respectively, both of which are preferably removably secured to the inner and outer shells in any suitable manner. Freezer inlet 18 is formed in end plate 32, end plate 33 including a passage 34 with which discharge pipe 21 communicates. The freezer chamber 19 (Figure 1) is supported on a cabinet 35 within which is disposed conventional refrigeration apparatus (not shown), as well as the driving motor 36 for the freezer.

As noted hereinbefore, dasher 20, or at least a portion thereof, is rotatably mounted within freezer chamber 19. Dasher 20 comprises a rectangular frame 37, on the opposite ends of which are formed bosses 37a and 37b. Disposed within dasher frame 37 is a whipping member, generally indicated at 43, from the opposite ends of which extend coaxial trunnions 38 and 39 through bosses 37a and 37b. Trunnion 38 is rotatably received in a bearing bushing 40 carried by front plate 33, while the rear trunnion 39 is received in a sleeve 41, in turn rotatably mounted in a bearing bushing 42 carried by rear plate 32. Under certain circumstances, it is desirable that whipper 43 remain stationary during rotation of dasher 20, while under other circumstances it is desirable that the whipper rotate oppositely to the direction of rotation of dasher 20 during the operation of the freezer. Under the first condition, whipper trunnion 38 is locked in any suitable manner so as to preclude rotation of the whipper. Where, however, it is desired to rotate the whipper, the end of its rear trunnion 39 is notched as at 39a (Figure 4) so as to interlock with a shaft 44 (see Figures 2 and 5) rotatably disposed within sleeve 41.

The rear or driven end of sleeve 41 is rotatably mounted on the walls of a casing 45 (Figure 5) and has keyed thereto a pulley 46 about which is trained a belt 47 adapted to be driven by a pulley 48 (Figure 1), in turn driven by freezer motor 36. As shown in Figure 2, the right-hand end of sleeve 41 carries a disc 49, from which extend drive pins 50 and 51 adapted respectively to engage opposite edges of side 37c of frame 37. Thus when sleeve 41 is driven by freezer motor 36 through the pulleys and belt described, drive pins 50 and 51 rotate the dasher frame 37.

If it is desired to rotate whipper 43, the transmission shown in Figure 5 is used. This transmission includes a casing 52 within which is disposed a bevel gear 53 fastened to sleeve 41 in any suitable manner. This bevel meshes with another bevel 54, which in turn meshes with a bevel gear 55 attached to shaft 44. It may accordingly be seen that when pulley 46 is driven to rotate sleeve 41, the bevels described coact to rotate shaft 44, but in the opposite direction. Thus, as viewed in Figure 3, dasher frame 37 is driven counterclockwise while whipper 43 is driven clockwise.

Dasher frame 37 also includes elongated side portions 37d and 37e (Figures 2 and 4) to the former of which is pivotally attached in any suitable manner a scraper blade 55, and to the latter of which is similarly pivoted another scraper blade 56. When the dasher is driven, centrifugal action swings these scraper blades into contact with the inner refrigerated surface of shell 28 so as to scrape congealed mix therefrom, the angle of the blades with respect to the surface of the shell being such as to direct the congealed mix toward the center of shell 28, or rather toward the whipper 43. It will be noted that the scraping edges of blades 55 and 56 are parallel to one another and to the axis of the dasher; while this relationship is not critical, I have found it preferable under many conditions of operation of the apparatus.

Whipper 43 may include an elongated box-like body 57, which is preferably square in cross-section and has closed ends to which the trunnions 38 and 39 are attached. To each side of whipper body 57 is attached a plurality of blades 58, illustratively four, these blades, as shown in Figures 2 and 4, lying in planes which are inclined to the axis of body 57 by an angle illustratively of the order of 45°. While this value of 45° is not critical, it should not vary either way to any substantial extent.

Of greater important than the value of the angle of inclination of blades 58 is their direction of inclination. This direction of inclination is such that the inward flow of mix from the scraper blades is directed rearwardly by blades 58 so that any given particle of the mix is constrained to follow the path described hereinabove. In other words, blades 58 are mounted eccentric of the axis of whipper 43 and at such an angle thereto as to have oblique flow interrupting surfaces 58a which face toward the rear or inlet end of freezer chamber 28. By thus positioning blades 58 the flow of mix from the scraper blades toward the axis of the freezer is momentarily diverted and directed rearwardly toward the inlet end of the freezer. This rearward flow is, of course, impeded by the general or over-all forward flow toward discharge 34 resulting from the pressure of inlet flow of the mix and air so that shortly the rearward diversion caused by blade surfaces 58a is overcome. The oblique blade surfaces 58a serve the additional purpose of directing the flow outwardly toward the refrigerated surface of shell 28 so that the whipped mix is again subjected to the freezing action of the shell. Thus, regardless of whether whipper 43 is stationary or rotating, a condition of substantial turbulence is created in the vicinity of the whipper which is highly effective in producing the ice cream texture and overrun desired. The degree of turbulence is greater when the whipper 43 is rotated. It should further be noted that operation of the dasher and whipper has no feeding effect on the contents of the freezer, the pressure of inlet flow being the sole agency effecting discharge of the ice cream. Thus the dasher and whipper are rendered more efficient for their primary functions as they are not depended on to effect discharge of the ice cream. Furthermore, by reason of the structural simplicity of the dasher and its ease of removal from the freezer, all sanitary regulations may be easily complied with and the down time of the apparatus reduced to a negligible factor.

Thus I have provided a method or process and apparatus for manufacturing ice cream which attains the several objects set forth above in a thoroughly practical and efficient manner.

I claim:

1. A method of continuously manufacturing ice cream, which includes the steps of, conducting under pressure alternate slugs of mix and air from respective sources of supply, said air slugs being of substantially uniform shape and said mix slugs being of substantially uniform shape, subjecting the mix and air to the action of a refrigerant, and at the same time agitating the mixture of mix and air.

2. A method of continuously manufacturing ice cream, which includes the steps of, conducting under pressure alternate slugs of mix and air from respective sources of supply, said air slugs being of substantially uniform shape and said mix slugs being of substantially uniform shape, subjecting the mix and air to the action of a refrigerant and at the same time agitating the mixture of mix and air, and controlling the volume of the slugs of air to predetermine the overrun value of the ice cream.

3. A method of continuously manufacturing ice cream, which includes the steps of, creating a flowing stream of mix from a supply, intermittently introducing into said stream predetermined amounts of air and at the same time stopping the flow of mix from said supply and subjecting the mixture of mix and air to the action of a refrigerant while at the same time agitating such mixture.

4. A method of continuously manufacturing ice cream, which includes the steps of, providing a supply of mix, pumping mix from said supply against gravity and at the same time maintaining the liquid level of the mix supply substantially constant, intermittently injecting quantities of air into the mix flow to create a stream comprising alternate slugs of mix and air, and continuously subjecting the mix and air to the action of a refrigerant.

5. A method of continuously manufacturing ice cream, which includes the steps of, providing a supply of mix, withdrawing quantities of mix from said supply while at the same time maintaining the liquid level of the mix supply substantially constant, intermittently injecting quantities of air at substantially atmospheric pressure into the mix flow to create a stream comprising alternate slugs of mix and air, and continuously subjecting said stream to the action of a refrigerant while agitating the same.

6. A method of continuously manufacturing ice cream, which includes the steps of, creating a stream of alternate slugs of mix and air, feeding said stream into a refrigerated chamber at a point adjacent the refrigerating inner surface thereof, directing said stream forwardly and inwardly of said surface toward the axis of said chamber, diverting the direction of flow of said stream toward the inlet end of said chamber and outwardly of the axis thereof, changing the direction of flow of said stream so that a given particle thereof ends a cycle of movement at a point adjacent said inner surface but forwardly of its starting point, repeating the foregoing steps until the mixture is congealed, and discharging the congealed mixture.

7. The method in accordance with claim 6, wherein the stream is subjected to violent agitation to comingle the mix and air.

8. A method of continuously manufacturing ice cream, which includes the steps of, creating a stream of alternate slugs of mix and air, and feeding said stream through a refrigerated zone wherein it is changed into a mixture of mix and air, any given particle of said mixture being subjected to forces within said zone which compel it to move along similar successive paths, each of which starts at a point adjacent the surface of the zone and extends therefrom forwardly and inwardly toward the zone axis, thence rearwardly and inwardly and thence outwardly and forwardly to the end of the path which lies at a point adjacent said surface but forward of said starting point.

9. The method in accordance with claim 8, wherein the particles are subjected to a whipping action at those points in their paths of movement adjacent the axis of said zone.

10. In a continuous freezer, in combination, a freezing chamber having an inlet and an outlet, a rotatable dasher disposed in said chamber, means to rotate said dasher, a tank for mix, and means including an intermittently opening valve connecting said tank and said chamber inlet to force a stream comprising alternate slugs of mix and air into said chamber, said last-mentioned means including a pipe having a connection to the atmosphere.

11. In a continuous freezer, in combination, a freezing chamber having an inlet and an outlet, a rotatable dasher disposed in said chamber, means to rotate said dasher, a tank for mix, means connecting said tank and said chamber inlet to force a stream comprising alternate slugs of mix and air into said chamber, said last-mentioned means including a pipe having a connection to the atmosphere, and means to intermittently close said connection.

12. In a continuous freezer, in combination, a freezing chamber having an inlet and an outlet, a rotatable dasher disposed in said chamber, means to rotate said dasher, a tank for mix, means connecting said sank and said chamber inlet to force a stream comprising alternate slugs of mix and air into said chamber, said last-mentioned means including a pipe having a connection to the atmosphere, means to intermittently close said connection, said last-mentioned means including a solenoid-operated valve, and timing means connected to said valve to determine its closed and open periods.

13. In a continuous freezer, in combination, a freezing chamber having an inlet and an outlet, a rotatable dasher disposed in said chamber, means to rotate said dasher, a tank for mix, and pipe and pump means interconnecting said tank and said chamber and including a connection to the atmosphere, said connection including an intermittently openable valve, said pipe and pump means and said valve being operable to effect the flow of a stream comprising alternate slugs of mix and air into said chamber.

14. In a continuous freezer, in combination, a tank for holding a supply of mix, a pump having an inlet located above said tank, a pipe connecting said tank with said inlet, an air line connected to said pipe between said pump inlet and said tank and leading to atmosphere, a valve in said air line, means to intermittently close said valve whereby when said valve is closed said pump draws mix from said tank and when open air from the atmosphere, thereby creating a stream of alternate slugs of mix and air, a freezer, and a pipe connecting the discharge side of said pump with the inlet side of said freezer.

15. A method of continuously congealing fluid material which includes the steps of providing a supply of mix, pumping a flow of mix against gravity from said supply, intermittently interrupting said flow by injecting thereinto predetermined amounts of air, thereby creating a continuous stream comprising alternate slugs of mix and air of predetermined volume, and continuously subjecting said stream to the action of a refrigerant while agitating the same.

16. A method of continuously congealing fluid material which includes the steps of providing a supply of mix, pumping a flow of mix against gravity from said supply, intermittently interrupting said flow by injecting thereinto predetermined amounts of air, thereby creating a continuous stream comprising alternate slugs of mix and air of predetermined volume, continuously subjecting said stream to the action of a refrigerant while agitating the same, and varying the volume of the slugs of mix by varying the volume of the slugs of air, thereby to control the overrun without varying the volume of the congealed material.

17. In a continuous freezer, in combination, a freezing chamber having an inlet and an outlet, a rotatable dasher disposed in said chamber, means to rotate said dasher, a tank for mix, means including a pump whose inlet is above said tank connecting said tank and said chamber inlet to force a stream comprising alternate slugs of mix and air into said chamber, said last-mentioned means also including a pipe having a connection to the atmosphere, said last-mentioned means further including mechanism operable to intermittently close said connection, and means associated with said tank including a device operable to maintain the mix level therein substantially constant.

18. In a continuous freezer, in combination, a freezing chamber having an inlet and an outlet, a rotatable dasher disposed in said chamber, means to rotate said dasher, a tank for mix, a constant displacement pump having an inlet and an outlet, a pipe connected to said pump inlet and extending into said tank, said inlet being so located with respect to the entry end of said pipe that upon operation of the pump mix is pumped from said tank against gravity, a second pipe having one end connected to said first pipe between said pump inlet and the entry end of said first pipe, a valve connected to said second pipe, means operable at selectively timed intervals to intermittently open and close said second pipe, the other end of said second pipe being open to atmosphere when said valve is open, whereby when said pump is in operation a stream comprising alternate slugs of mix and air is forced through its outlet, and a pipe connecting said pump outlet with the inlet of said freezing chamber.

19. Apparatus in accordance with claim 18, including means to maintain the level of mix in said tank substantially constant.

References Cited in the file of this patent

UNITED STATES PATENTS

| | | |
|---|---|---|
| 1,477,279 | Peck | Dec. 11, 1923 |
| 1,783,867 | Vogt | Dec. 2, 1930 |
| 1,907,486 | Boileau | May 9, 1933 |
| 1,993,130 | Ballew | Mar. 5, 1935 |
| 2,013,018 | Vogt | Sept. 3, 1935 |
| 2,211,387 | Routh | Aug. 13, 1940 |